United States Patent [19]

Berntsen

[11] Patent Number: 6,083,548
[45] Date of Patent: Jul. 4, 2000

[54] PROCESS FOR PRODUCING A BUTTER-LIKE FOOD FAT

[75] Inventor: Sten Berntsen, Videbæk, Denmark

[73] Assignee: APV Pasilac A/S, Arhus, Denmark

[21] Appl. No.: 08/146,025

[22] PCT Filed: May 8, 1992

[86] PCT No.: PCT/DK92/00152

§ 371 Date: Nov. 8, 1993

§ 102(e) Date: Nov. 8, 1993

[87] PCT Pub. No.: WO92/19111

PCT Pub. Date: Nov. 12, 1992

[30] Foreign Application Priority Data

May 8, 1991 [DK] Denmark ................................. 0867/91

[51] Int. Cl.⁷ ................................................. A23C 15/02
[52] U.S. Cl. ............................................ 426/530; 426/581
[58] Field of Search ................................... 426/581, 583, 426/585, 586, 603, 607, 580, 530

[56] References Cited

U.S. PATENT DOCUMENTS

| | | | |
|---|---|---|---|
| 2,878,126 | 3/1959 | Roberts | 426/586 |
| 4,112,132 | 9/1978 | Badertscher | 426/603 |
| 4,209,546 | 6/1980 | Johansson | 426/585 |
| 4,315,955 | 2/1982 | Cramer | 426/585 |
| 4,350,715 | 9/1982 | Rek | 426/603 |
| 4,438,149 | 3/1984 | Verhagan | 426/586 |
| 4,479,976 | 10/1984 | Lansbergen | 426/586 |
| 4,716,047 | 12/1987 | Biernoth | 426/603 |
| 4,959,239 | 9/1990 | Ernsting | 426/581 |
| 4,970,087 | 11/1990 | Admed | 426/583 |
| 5,133,985 | 7/1992 | Seigler | 426/581 |
| 5,158,797 | 10/1992 | Studer | 426/581 |

FOREIGN PATENT DOCUMENTS

| | | | |
|---|---|---|---|
| 54174/79 | 2/1981 | Australia | 426/581 |
| 5579/89 | 11/1988 | Denmark . | |
| 390947 | 10/1990 | European Pat. Off. | 426/581 |
| 0421504 | 4/1991 | European Pat. Off. . | |
| 445857 | 9/1991 | European Pat. Off. | 426/581 |
| 2021140 | 11/1979 | United Kingdom . | |
| 2130232 | 5/1984 | United Kingdom . | |
| 2243157 | 10/1991 | United Kingdom | 426/581 |
| 83/01728 | 5/1983 | WIPO | 426/581 |
| 8910700 | 11/1989 | WIPO . | |

*Primary Examiner*—Carolyn Paden
*Attorney, Agent, or Firm*—McDermott, Will & Emery

[57] ABSTRACT

A butter-like food fat being directly spreadable at refrigeration temperature, i.e. 4 to 5° C., and preferably containing 80 to 83% fat is produced by addition of vegetable oil, water, and salt. Initially conventional butter is produced, which preferably contains 80 to 83% fat and which is made exclusively from milk. Subsequently, the conventional butter is passed continuously through a tight, closed plant, whereby the butter initially passes through a kneading station followed by addition of half the total amount of added vegetable oil. Then the butter mixture passes through a mixer, whereafter the remaining portion of the amount of added vegetable oil and water and salt are added. In this manner buttermilk results exclusively as a by-product from the production of the conventional butter and contains therefore nothing but pure milk fat. Accordingly, the buttermilk can be used as market milk and sold at the highest possible market price. In addition, a particularly high production flexibility is obtained during the production of butter.

9 Claims, 1 Drawing Sheet

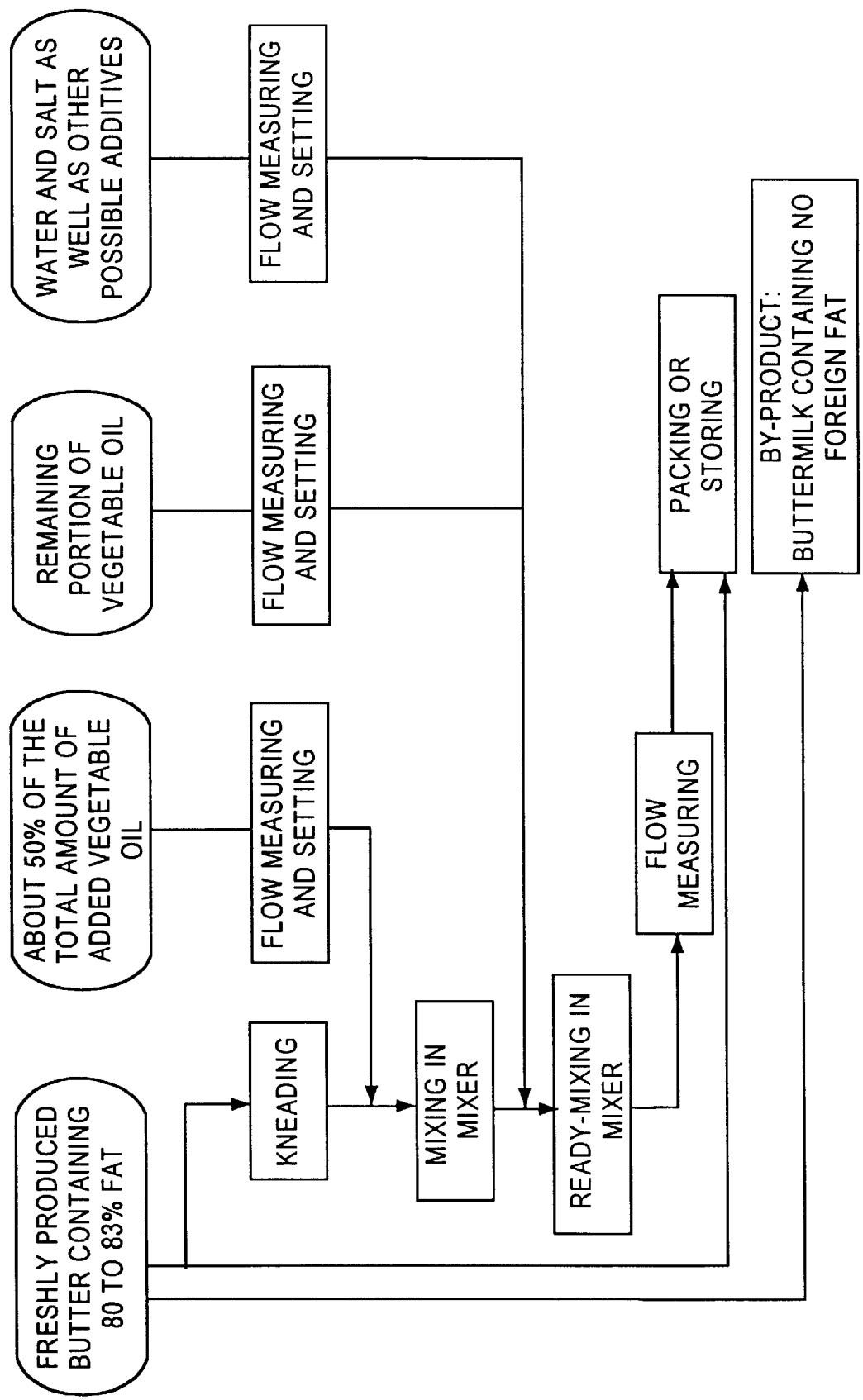

PROCESS FOR PRODUCING A BUTTER-LIKE FOOD FAT

TECHNICAL FIELD

The invention relates to a process for producing a butter-like food fat, which is directly spreadable at refrigeration temperature, i.e. 4 to 5° C., and which preferably contains 80 to 83% fat, said process including addition of vegetable and/or animal oil, where butter-milk is produced as a by-product.

BACKGROUND ART

For instance Danish Printed Accepted Application No. 152.245 discloses a process of the above type, where the main portion of the total amount of added vegetable and/or animal oil is added and mixed with conventionally soured or unsoured cream before the churning, whereafter the remaining amount of vegetable and/or animal oil is added at the kneading station of the butter machine. The resulting ready-made butter-like food fat contains an amount of 15 to 30% of vegetable and/or animal oil. The addition of the major portion of the vegetable and/or animal oil to the cream before the churning has the effect that some of the oil is lost in the buttermilk always being a by-product of the butter production. Therefore, the buttermilk contains vegetable and/or animal fat not being butter fat. In addition, it is necessary to reduce the churning temperature to 5 to 6° C., which is too low for ensuring the lowest possible consumption of energy in the butter machine and the lowest possible loss of fat in the buttermilk. The content of foreign fat/oil in the buttermilk prevents said buttermilk from being used as a market product, and therefore it can only be used as a feedstuff product. Accordingly, the market price of the buttermilk is reduced to a minimum.

GB-A-2 021 140 discloses a process for producing a butter-like food fat being well spreadable at refrigeration temperature from ready-made butter by admixing vegetable oils and stabilizer to said butter during a heating of the mixture to 30 to 35° C. According to the publication it is necessary that the stabilizer is admixed water and added to the softened butter before the vegetable oil is added to the mixture.

The consistency of the butter-like food fat is softer than the consistency of conventional butter, and therefore it is necessary to use plastic cups as packing for the butter-like food fat, other materials, such as an aluminium sheet, being unacceptable as packing. In order to utilize the total capacity of a butter machine it is therefore necessary that the same capacity applies to the succeeding cup-filling line for the butter-like food fat as the capacity applying to the aluminium sheet-packing line for the conventional butter, only one line being usable at a time by such a procedure.

BRIEF DESCRIPTION OF INVENTION

The process according to the present invention is characterised by continuously passing conventional butter preferably containing 80 to 83% fat and exclusively being produced from milk through a tight, closed plant, whereby the butter initially passes through a kneading station and subsequently through a mixing station, where the vegetable and/or animal oil as well as water are added. In this manner the buttermilk results exclusively as a by-product from the production of a conventional butter, and accordingly it only contains pure milk fat. The resulting buttermilk can be used as a market product and sold at the highest possible market price. Furthermore it is possible to optimize the initial production of conventional butter so as to involve the lowest possible consumption of energy and loss of fat in connection with a 100% butter capacity, and the conventional butter can be advanced according to desire for packing or for further processing so as to allow production of the butter-like food fat followed by packing. In this manner it is possible on the same production plant to simultaneously produce conventional butter and the butter-like food fat. The butter-like food fat does not contain any emulsifier, stabilizer or other "chemical" additive, which today is of increasing importance to the consumers.

According to the invention the first portion of the total amount of added vegetable and/or animal oil is added before the butter mixture passes through a first mixing means, and the remaining portion of the vegetable and/or animal oil is subsequently added before the butter mixture passes through a ready-mixing means. As a result, a particularly lenient mixing of the butter and the oil and the water is obtained together with a particularly good and uniform distribution of the oil and the water in the butter.

Furthermore according to the invention the water may in a particularly advantageous manner be added to the butter mixture immediately before said mixture passes through the ready-mixing means.

Moreover according to the invention, salt may in a particularly advantageous manner be added to the butter mixture immediately before said mixture passes through the ready-mixing means.

According to the invention, 15 to 30% of vegetable fat, 16% of water, and 0.8 to 1.2% of salt may be added to the butter mixture, whereby a butter-like food fat is obtained which presents a particularly good spreadability at refrigeration temperature as well as particularly good taste properties.

Finally according to the invention, half the total amount of added vegetable oil may be added before the butter mixture passes through the first mixing means, whereby a particularly advantageous mixing of the vegetable oil is obtained.

BRIEF DESCRIPTION OF THE DRAWING

The invention is explained in greater detail below with reference to a particularly preferred example and the accompanying drawing, in which a flow chart is shown for the particularly preferred example of the process for producing a butter-like food fat.

BEST MODE FOR CARRYING OUT THE INVENTION

Following the flow chart shown in the drawing the process according to the invention involves the steps of initially producing conventional butter preferably containing 80 to 83% fat and exclusively being made from milk. The butter is produced by means of any suited butter production machine, such as the one described in PCT/DK90/00284. A by-product in form of buttermilk results from the butter production, the fat of said buttermilk exclusively being pure milk fat.

The freshly produced butter is then advanced continuously either to a packing line, where the butter is packed in sheet in a conventionally known manner, or further through a tight, closed plant for the production of the butter-like food fat which is directly spreadable at refrigeration temperature, i.e. 4 to 5° C., and preferably contains 80 to 83% fat.

The tight, closed plant may for instance be a plant like the one described in PCT/DK90/00284, to be used for the production of low-fat butter, said plant, however, being provided with a number of flowmeters and setting units so as to achieve the desired composition of the ready-made butter-like food fat.

By the process according to the invention, the conventional butter passes initially through a kneading station, whereafter a first portion of a total amount of added vegetable oil is added. The first portion amounts to approximately 80% of the total amount of added vegetable oil. Subsequently, the butter mixture passes through a first mixing means, preferably a known mixer, whereafter the remaining portion of the total amount of added vegetable oil is added together with water as well as other possible additives, such as salt and possible flavours.

Then the butter mixture continues through a ready-mixing means, which may also be a known mixer. The ready-made butter-like food fat is then advanced to a packing station, where the butter must be filled into cups due to its softness.

The ready-made butter-like food fat contains 80 to 83% fat, 15 to 30% thereof being vegetable fat, 16% being water and 0.8 to 1.2% being salt. Salt can, however, be added in amounts up to 2.5% according to desire. Flow-meters and setting units measure and set the first portion of the total amount of added vegetable oil, the remaining portion of the total amount of added vegetable oil, the amount of water, and the amount of salt, as well as the amount of ready-made butter-like food fat in order to obtain the desired proportions of vegetable fat, water, and salt in the ready-made butter-like food fat. The amount of salt is usually added to the water in an amount corresponding to the amount of salt in the water-phase of the butter mixture, and a desired salt content of for instance 1% in the ready-made butter necessitates an amount of salt in the water of 6.25% relative to an amount of water of 16%.

In this manner the buttermilk exclusively results as a by-product from the production of the conventional butter, and accordingly it only contains pure milk fat, said buttermilk always resulting as a by-product from the churning during the production of butter. Therefore the buttermilk can be used as a market product and sold at the highest possible market price. Furthermore it is possible to optimize the initial production of conventional butter so as to involve the lowest possible consumption of energy and loss of fat in connection with a 100% butter capacity, and the conventional butter can be advanced according to desire for packing or for further processing so as to allow production of the butter-like food fat followed by packing. In this manner it is possible on the same production plant to simultaneously produce conventional butter and the butter-like food fat.

In addition it should be mentioned, that the churning of butter during the production of the conventional butter can now be performed under the optimum temperatures usually applying to production of butter unlike the previous processes for the production of butter-like food fat. Previously, it was necessary to reduce the temperature to 4 to 5° C. which involved a considerably increased consumption of energy in the butter machine.

Many modifications can be carried out without thereby deviating from the scope of the invention. Other additives, such as lactic starters, may for instance also be added in the mixing station.

What is claimed is:

1. A process for producing a butter-like food fat spreadable at a refrigeration temperature from 4° to 5° C., comprising:
    passing butter obtained from milk through a kneader;
    adding a first portion of an oleaginous material consisting essentially of an oil to the butter to form a first mixture;
    passing the first mixture through a first mixing means;
    adding a remaining portion of the oleaginous material and water to the first mixture to form a second mixture;
    passing the second mixture through a second mixing means;
    recovering the butter-like food fat; and
    recovering buttermilk obtained as a by-product from production of the butter.

2. A process according to claim 1, where the oil is a vegetable oil, an animal oil, or mixtures thereof.

3. A process according to claim 2 where the butter-like food fat and the butter contain 80 to 83% fat.

4. A process according to claim 3, further comprising adding a salt to the second mixture before passage through the second mixing means.

5. A process according to claim 3, where the butter-like food fat comprises 15–30% vegetable oil, 16% water, and 0.8 to 1.2% salt.

6. A process according to claim 3, comprising adding one half a total amount of vegetable oil to the first mixture before passage through the first mixing means.

7. A process according to claim 3, where the butter-like food fat is free of emulsifiers, stabilizers, or additives other than those based on lactic acid.

8. A process according to claim 1, where the oleaginous material consists of an oil.

9. A process for producing a butter-like food fat spreadable at a refrigeration temperature from 40° to 5° C., the steps consisting essentially of:
    passing butter obtained from milk through a kneader;
    adding a first portion of an oleaginous material consisting essentially of an oil to the butter to form a first mixture;
    passing the first mixture through a first mixing means;
    adding a remaining portion of the oleaginous material and water to the first mixture to form a second mixture;
    passing the second mixture through a second mixing means;
    recovering the butter-like food fat; and
    recovering buttermilk obtained as a by-product from production of the butter.

* * * * *